US010487969B2

(12) United States Patent
Roach et al.

(10) Patent No.: US 10,487,969 B2
(45) Date of Patent: Nov. 26, 2019

(54) PIPE FITTING APPARATUS AND METHODS

(71) Applicant: IPS, CORPORATION—WELD-ON DIVISION, Compton, CA (US)

(72) Inventors: Jack Roach, Durham, NC (US); Fabio Castellani, Long Beach, CA (US); Jordan Boye, Altadena, CA (US)

(73) Assignee: IPS, CORPORATION-WELD-ON DIVISION, Compton, CA (US)

( * ) Notice: Subject to any disclaimer, the term of this patent is extended or adjusted under 35 U.S.C. 154(b) by 944 days.

(21) Appl. No.: 14/858,394

(22) Filed: Sep. 18, 2015

(65) Prior Publication Data

US 2016/0091131 A1    Mar. 31, 2016

Related U.S. Application Data

(60) Provisional application No. 62/147,181, filed on Apr. 14, 2015, provisional application No. 62/056,143, filed on Sep. 26, 2014.

(51) Int. Cl.
*F16L 37/10* (2006.01)
*F16L 13/11* (2006.01)
(Continued)

(52) U.S. Cl.
CPC ............ *F16L 37/10* (2013.01); *F16L 13/116* (2013.01); *F16L 21/08* (2013.01); *F16L 47/02* (2013.01)

(58) Field of Classification Search
CPC .......... F16L 13/10; F16L 13/11; F16L 13/116; F16L 13/141; F16L 13/142; F16L 47/02;
(Continued)

(56) References Cited

U.S. PATENT DOCUMENTS 627,673 A * 6/1899 McDonald ............. F16L 13/11
285/296.1
3,847,694 A * 11/1974 Stewing ................. B29C 61/00
156/86
(Continued)

FOREIGN PATENT DOCUMENTS

EP    0702184 A1 *  3/1996  ............. F16B 21/20
EP    1564473 A1 *  8/2005  ............. F16L 33/22
(Continued)

OTHER PUBLICATIONS

Notification Concerning Transmittal of International Preliminary Report on Patentability, PCT/US2015/051157, dated Apr. 6, 2017.
(Continued)

*Primary Examiner* — David Bochna
*Assistant Examiner* — James A Linford
(74) *Attorney, Agent, or Firm* — Myers Bigel, P.A.

(57) ABSTRACT

A pipe fitting includes a tubular member comprising a socket and a centering device within the socket. The socket is configured to receive an end of a pipe section therein such that a gap exists between an outer surface of the pipe section and an inner surface of the socket. An annular pipe stop extends from the inner surface of the socket and is configured to matingly engage with the end of the pipe section. A pair of ports extend through the tubular member in circumferentially spaced-apart relationship and are in fluid communication with the gap. The centering device is configured to maintain a coaxial relationship between the pipe section and the socket and such that the gap is substantially circumferentially uniform. A removable and reusable clamp secures the pipe section within the socket as a bonding agent is extruded into the gap via one of the ports.

25 Claims, 13 Drawing Sheets

(51) Int. Cl.
*F16L 21/08* (2006.01)
*F16L 47/02* (2006.01)

(58) Field of Classification Search
CPC . F16L 21/02; F16L 21/03; F16L 21/06; F16L 21/08; F16L 37/091
USPC .................. 285/407, 406, 408, 411, 415, 420
See application file for complete search history.

(56) References Cited

U.S. PATENT DOCUMENTS

| | | | |
|---|---|---|---|
| 4,052,244 A | 10/1977 | Skoultchi | |
| 4,334,342 A * | 6/1982 | Hall | E21B 33/14 175/423 |
| 4,921,284 A * | 5/1990 | Singeetham | F16L 19/0231 285/114 |
| 5,656,345 A | 8/1997 | Strand et al. | |
| 6,949,602 B2 | 9/2005 | Gosiewski et al. | |
| 7,341,285 B2 | 3/2008 | McPherson | |
| 8,398,122 B2 | 3/2013 | Crompton et al. | |
| 2009/0230675 A1* | 9/2009 | Densmore | F16L 21/08 285/236 |
| 2009/0302599 A1 | 12/2009 | Larsson et al. | |
| 2010/0314864 A1 | 12/2010 | Lemke et al. | |
| 2011/0037251 A1* | 2/2011 | Rodgers | F16L 23/032 285/123.12 |
| 2012/0043752 A1 | 2/2012 | McPherson | |
| 2012/0049509 A1 | 3/2012 | Lininger et al. | |
| 2013/0181436 A1 | 7/2013 | McPherson et al. | |
| 2013/0261247 A1 | 10/2013 | Briggs et al. | |
| 2013/0267670 A1 | 10/2013 | Xie | |

FOREIGN PATENT DOCUMENTS

| | | | |
|---|---|---|---|
| FR | 1278914 A * | 12/1961 | ............... F16L 13/11 |
| FR | 2784166 A1 * | 4/2000 | ............... F16L 21/06 |
| WO | WO-2014118769 A1 * | 8/2014 | ............... F16L 21/03 |

OTHER PUBLICATIONS

Notification of Transmittal of the International Search Report and the Written Opinion of the International Searching Authority, or the Declaration, PCT/US2015/051157, dated Dec. 18, 2015, 20 pages.

* cited by examiner

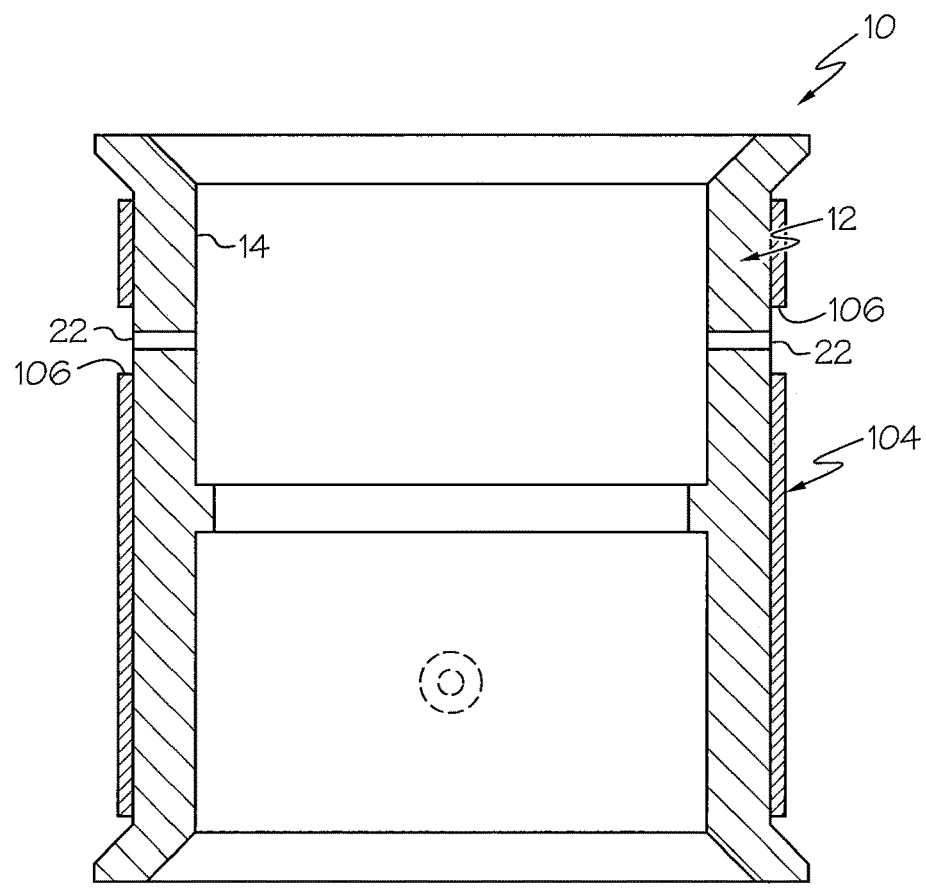
FIG. 14
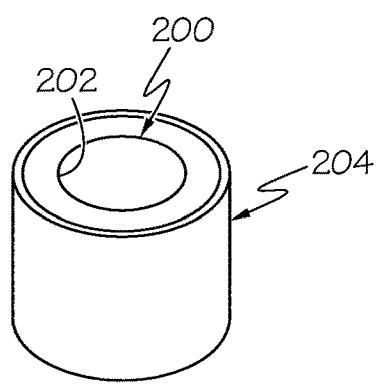 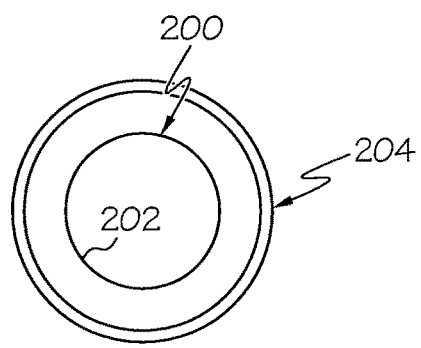
FIG. 15    FIG. 16

PIPE FITTING APPARATUS AND METHODS

RELATED APPLICATIONS

This application claims the benefit of and priority to U.S. Provisional Patent Application No. 62/056,143, filed Sep. 26, 2014, and U.S. Provisional Patent Application No. 62/147,181, filed Apr. 14, 2015, the disclosures of which are incorporated herein by reference as if set forth in their entireties.

FIELD OF THE INVENTION

The present invention relates generally to pipes and fittings, more particularly, to joining pipes and fittings.

BACKGROUND OF THE INVENTION

The vast majority of connections of piping components (pipe, valves, fittings, etc.) require the connection to be permanent and not something that can be disassembled like a threaded or flanged connection (i.e. mechanical joint). Depending on the piping system materials, permanent jointing methods such as solvent cementing, heat fusion, welding and fiberglass hand layup have been utilized. However, each one of these methods presents challenges varying from VOC emissions to the need for power tools and all heavily rely on skilled labor for the success of the union.

More recently adhesive products (bonding agents) have been developed for joining thermoplastic, thermoset, and metallic pipe and fittings for a multitude of applications (both pressure and non-pressure). Though bonding agents have been in use for decades, they typically have not been strong enough to handle the harsh environments of some piping installations. Newer adhesives can and do stand-up to the harshest of pressure and non-pressure piping environments. These new bonding agents can be applied via brush application or via injection. In a brush application, the bonding agent is applied to the pipe end and/or fitting socket with a brush prior to assembly. The brush method may require that special attention be paid to assembly techniques in order to avoid depositing into the piping water-way excess bonding agent or having excess adhesive drip from the socket entrance. The brush method may also require special attention to pipe and fitting tolerances as well as pipe and fitting out of roundness.

Prior injection application methods may involve cumbersome clamps and sealing devices that are installed prior to injecting a bonding agent. These cumbersome clamps and sealing devices incorporate some form of secondary additional seal at the socket bottom to prevent leakage of the bonding agent during the injection process.

SUMMARY OF THE INVENTION

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a pipe fitting includes a tubular member comprising a socket and a centering device within the socket. The pipe fitting can be shaped as a straight union, an elbow, a "T", a "Y", a cross or any other desired geometry. The socket is configured to receive an end of a pipe section therein such that a gap exists between an outer surface of the pipe section and an inner surface of the socket. An annular pipe stop extends from the inner surface of the socket and is configured to matingly engage with the end of the pipe section. In some embodiments, the annular pipe stop has a radial length that is equal to or greater than a wall thickness of the pipe section, which can improve the hoop strength of the pipe fitting.

A pair of ports (one for bonding agent injection and the other for exhaust) extend through the tubular member in circumferentially spaced-apart relationship (e.g., diametrically opposed, etc.) and are in fluid communication with the gap. The centering device is configured to maintain a coaxial relationship between the pipe section and the socket and such that the gap is substantially circumferentially uniform and such that a bonding agent injected therein is substantially circumferentially uniform.

In some embodiments the centering device is a centering ring that is positioned within the socket prior to insertion of the pipe section. The centering ring includes an annular member having opposite inner and outer peripheral edges, a first plurality of inwardly projecting gripping teeth on the inner peripheral edge in circumferentially spaced-apart relationship, and a second plurality of outwardly projecting gripping teeth on the outer peripheral edge in circumferentially spaced-apart relationship. Typically, adjacent ones of the first plurality of gripping teeth are spaced-apart between about one-quarter inch and about one inch (0.25"-1.0"), and adjacent ones of the second plurality of gripping teeth are spaced-apart between about one-quarter inch and about one inch (0.25"-1.0"). However, other distances between adjacent gripping teeth (both the first plurality and the second plurality) may be utilized.

The annular member may have a frusto-conical configuration in some embodiments. In other embodiments, the annular member is substantially planar.

In some embodiments, each of the first and second plurality of gripping teeth have a generally triangular shape; however, other shapes are possible.

In some embodiments, the first plurality of gripping teeth are larger than the second plurality of gripping teeth. In other embodiments, the first and second plurality of gripping teeth have substantially the same size.

In some embodiments, a distance that each of the first plurality of gripping teeth project inwardly from the inner peripheral edge is greater than a distance that each of the second plurality of gripping teeth project outwardly from the outer peripheral edge.

In some embodiments, the first plurality of gripping teeth are staggered relative to the second plurality of gripping teeth. In other embodiments, each one of the first plurality of gripping teeth are substantially adjacent to a respective one of the second plurality of gripping teeth.

In some embodiments the centering device comprises a plurality of raised members or bumps extending outwardly from the inner surface of the socket in circumferentially spaced-apart relationship. For example, in some embodiments, the raised members are substantially equidistantly spaced-apart (i.e., spaced-apart 120°).

The pipe fitting also includes a removable and reusable clamp that secures the pipe section within the socket as a bonding agent is extruded into the gap via one of the ports. The clamp includes a plurality of arcuate segments, each arcuate segment having a sealing member attached thereto. In some embodiments, the sealing member of each arcuate segment is removably secured to the arcuate segment first member. As such, the sealing members can be replaced if worn or damaged.

In some embodiments, a length of each sealing member is greater than a length of the respective arcuate segment to which the sealing member is attached. This causes the ends of adjacent sealing members to contact each other and form an annular seal that surrounds the pipe section.

The clamp also includes a tightening mechanism that is configured to radially compress the clamp such that the arcuate segments and their sealing members move radially inward such that the sealing members are compressed into sealing engagement with the tubular member and pipe section to seal an open end of the gap. When a bonding agent is injected into the gap via a port, the sealing members prevent the bonding agent from leaking out of the open end of the socket. The clamp also serves an additional function, which is to draw the pipe downward tight against the socket bottom, thus creating a positive seal between the pipe edge and fitting pipe-stop at the bottom of the socket without the need for an additional secondary seal. Once the bonding agent has been injected, the clamp is removed. The clamp can then be reused.

In some embodiments, the tubular member includes an annular flange having a sloped outer wall. Each arcuate segment of the clamp includes first and second members that are matingly engaged and that are also secured together via at least one fastener. Each first member includes an arcuate groove configured to receive a portion of the tubular member annular flange. The arcuate groove in each first member also includes a sloped inner wall that engages the annular flange sloped outer wall. The sloped inner walls and the annular flange sloped outer wall move relative to each other as the first members are moved radially inwardly via the clamp tightening mechanism and such that the clamp first members move in an axial direction towards the tubular member. In some embodiments, the second member of each clamp segment includes teeth configured to engage the pipe section.

According to some embodiments of the present invention, a method of forming a pipe joint between a pipe section and a pipe fitting includes inserting an end of the pipe section into a socket of the pipe fitting, and attaching a removable clamp to the pipe section and pipe fitting. The pipe fitting can be shaped as a straight union, an elbow, a "T", a "Y", a cross or any other desired geometry. The socket includes a centering device and a pipe stop that is configured to receive the end of the pipe section. Prior to insertion within the socket, material is removed from the pipe end to create a profiled end that matingly engages with the pipe stop. Inserting the end of the pipe section into the socket includes engaging the profiled end of the pipe section with the pipe stop.

The clamp includes a plurality of arcuate segments and a tightening mechanism, and each arcuate member has a removable/replaceable sealing member. The method further includes radially compressing the arcuate members via the tightening mechanism to cause the respective sealing members to seal an open end of the gap. The clamp also serves an additional function, which is to draw the pipe downward tight against the socket bottom, thus creating a positive seal between the pipe edge and fitting pipe-stop at the bottom of the socket without the need for an additional secondary seal. A bonding agent is then injected into the gap via a port that extends through the pipe fitting. Once the bonding agent has been injected, the clamp is removed. The clamp can then be reused.

The centering device is configured to maintain a coaxial relationship between the pipe section and the socket and such that a substantially circumferentially uniform gap exists between an outer surface of the pipe section and an inner surface of the socket. In some embodiments, the centering device is a centering ring that includes an annular member having opposite inner and outer peripheral edges, a first plurality of inwardly projecting gripping teeth on the inner peripheral edge in circumferentially spaced-apart relationship, and a second plurality of outwardly projecting gripping teeth on the outer peripheral edge in circumferentially spaced-apart relationship. Inserting the end of the pipe section into the socket includes inserting the end of the pipe section through the centering ring such that the first plurality of gripping teeth engage the outer surface of the pipe section.

In other embodiments, the centering device includes a plurality of raised members or bumps extending outwardly from the inner surface of the socket in circumferentially spaced-apart relationship. Inserting the end of the pipe section into the socket includes inserting the end of the pipe section into the socket such that the plurality of raised members engage the outer surface of the pipe section.

According to some embodiments of the present invention, a reinforcement band, such as a metallic band, is positioned around the tubular member. The reinforcement band increases the hoop strength of the pipe fitting. In some embodiments, the reinforcement band includes a pair of openings formed therein, each opening associated with a respective one of the pair of adhesive injection ports in the pipe fitting.

According to some embodiments of the present invention, the pipe fitting tubular member includes glass fiber reinforcement (GFR) material, which can increase the hoop strength of the pipe fitting.

The use of a reinforcement band or GFR material reduces hoop stress in the wall of the socket of a pipe fitting and improves the dimensional stability of the pipe fitting, particularly in high pressure/temperature applications. As such, the use of GFR material in a pipe fitting and the use of a reinforcement band provides additional flexibility to a piping system designer when selecting a cost effective solution to the pressure requirements of a given piping system.

According to other embodiments of the present invention, a pipe connector kit includes a tubular member having a socket configured to receive an end of a pipe section therein, a centering device within the socket that is configured to maintain a coaxial relationship between the pipe section and the socket and such that a gap between an outer surface of the pipe section and an inner surface of the socket is substantially circumferentially uniform, and a removable clamp that secures the pipe section within the socket as a bonding agent is extruded into the gap via a port in the tubular member. The kit may also include a container of a bonding agent that is configured to inject the bonding agent into the gap via the port.

The clamp includes a plurality of arcuate segments, each having a respective sealing member. The clamp also includes a tightening mechanism that is configured to radially compress the clamp such that the sealing members are compressed into sealing engagement with the tubular member and pipe section to seal an open end of the gap. When a bonding agent is injected into the gap via a port, the sealing members prevent the bonding agent from leaking out of the open end of the socket. The clamp also serves an additional function, which is to draw the pipe downward tight against the socket bottom, thus creating a positive seal between the pipe edge and fitting pipe-stop at the bottom of the socket without the need for an additional secondary seal. Once the bonding agent has been injected, the clamp is removed. The clamp can then be reused.

The tubular member includes an annular flange having a sloped outer wall, and each arcuate segment of the clamp includes first and second members secured together. Each first member includes an arcuate groove that is configured to receive a portion of the tubular member annular flange. The arcuate groove in each first member includes a sloped inner wall that engages the annular flange sloped outer wall. The sloped inner walls of the arcuate segments and the annular flange sloped outer wall move relative to each other as the first members are radially moved inwardly via the tightening mechanism and such that the clamp first members move in an axial direction towards the tubular member.

In some embodiments, the centering device is a centering ring that includes an annular member having opposite inner and outer peripheral edges, a first plurality of inwardly projecting gripping teeth on the inner peripheral edge in circumferentially spaced-apart relationship, and a second plurality of outwardly projecting gripping teeth on the outer peripheral edge in circumferentially spaced-apart relationship. In other embodiments, the centering device comprises a plurality of raised members or bumps extending outwardly from the inner surface of the socket in circumferentially spaced-apart relationship.

Embodiments of the present invention provide an injection socket and clamp with an elegant design that guarantees alignment of a pipe into the fitting socket, thus creating interstitial space necessary for the successful bonding of the parts, that greatly simplifies the joining process itself requiring little or no skills to perform the few simple steps of the process, and that eliminates the need for a secondary additional seal for sealing the socket bottom to prevent leakage of the bonding agent during the injection process. Embodiments of the present invention accomplish this by forcing a pipe end tight against the socket bottom via the clamp and ramp design described herein. Moreover, embodiments of the present invention are more efficient (less waste) than brush methods and provide for full and complete filling of a well-defined interstitial space between a pipe and fitting socket. In addition, clamps, according to embodiments of the present invention can be reusable.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

In FIG. 1, a portion of a male end of a pipe section is inserted into the socket and is being held in place via the clamp so that a bonding agent can be injected into a gap between the pipe section and the socket to join the pipe section to the pipe fitting.

FIG. 14 is a side cut-away view of a pipe fitting with a reinforcement band positioned therearound, according to some embodiments of the present invention.

FIG. 15 is a perspective view of a pipe fitting with a reinforcement band positioned therearound, according to some embodiments of the present invention.

FIG. 16 is an end view of the pipe fitting of FIG. 15 illustrating the reinforcement band.

DETAILED DESCRIPTION OF THE INVENTION

Figure 1:
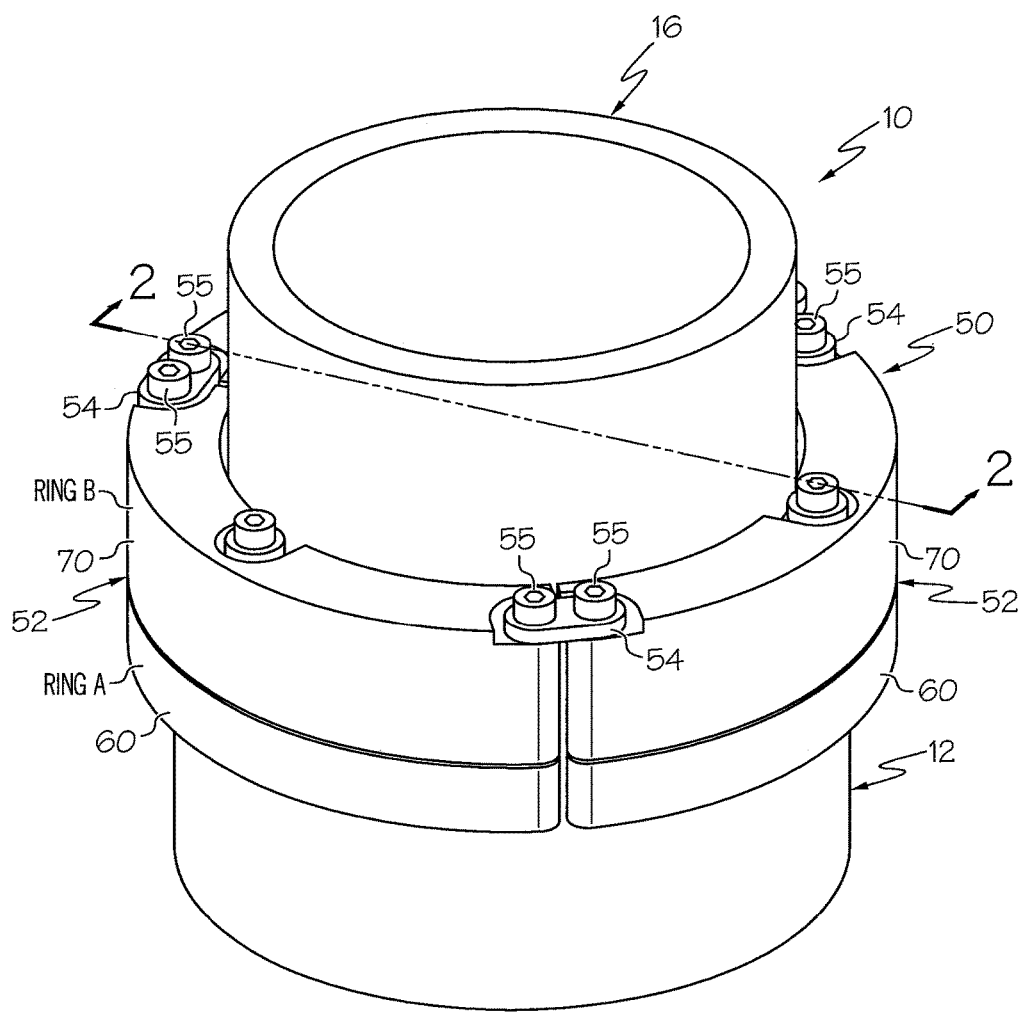
FIG. 1 is a perspective view of a pipe fitting that includes a tubular member having a socket, a centering device within the socket, and a removable clamp, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary more or less, for example by +/−20%, +/−10%, +/−5%, +/−1%, +/−0.5%, +/−0.1%, etc.

The term "frusto-conical", as used herein, means having the shape of a cone with the narrow end, or tip, removed.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Figure 2:
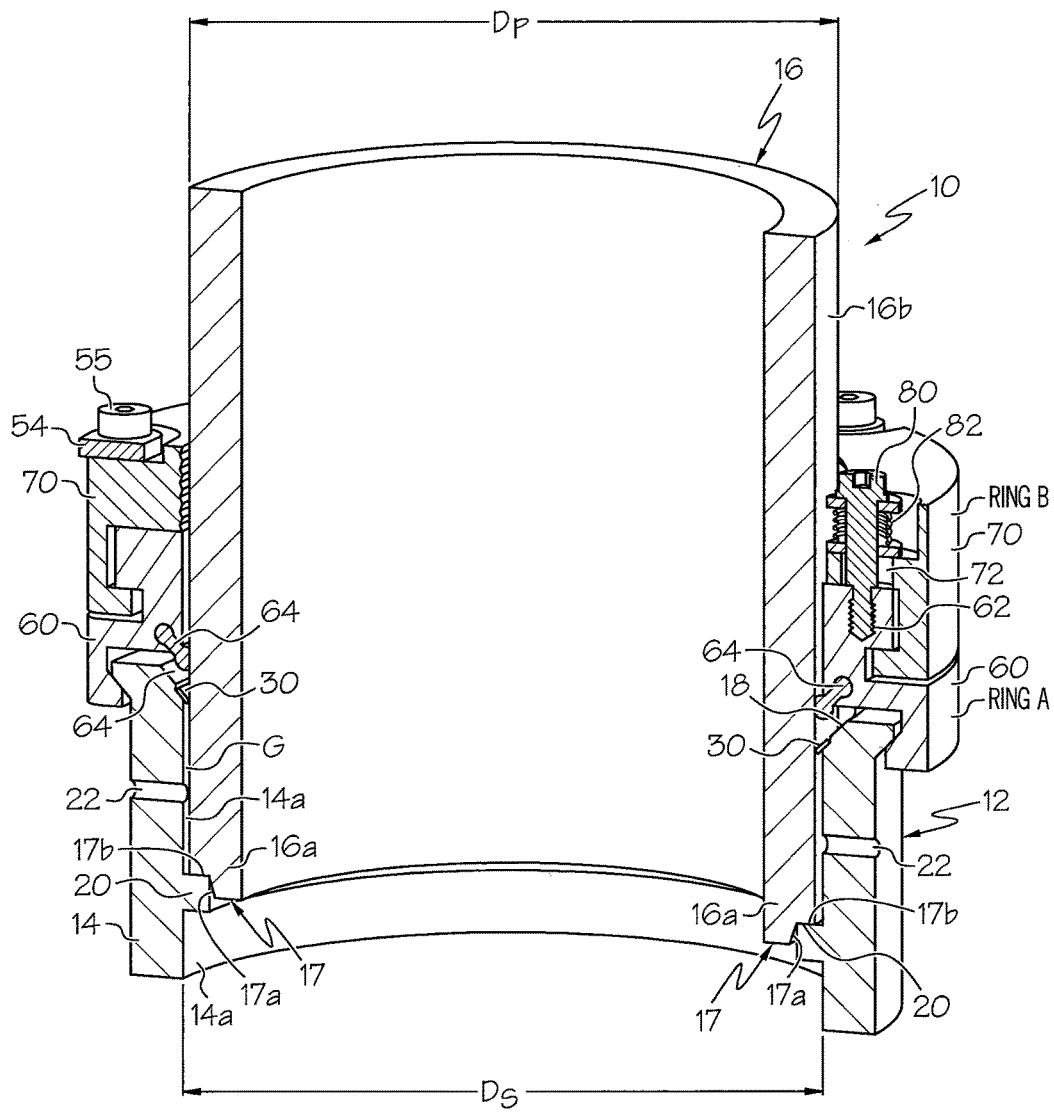
FIG. 2 is a cross-sectional view of the pipe fitting of FIG. 1 taken along lines 2-2 and illustrating a centering ring being utilized as the centering device, according to some embodiments of the present invention.
Figure 3:
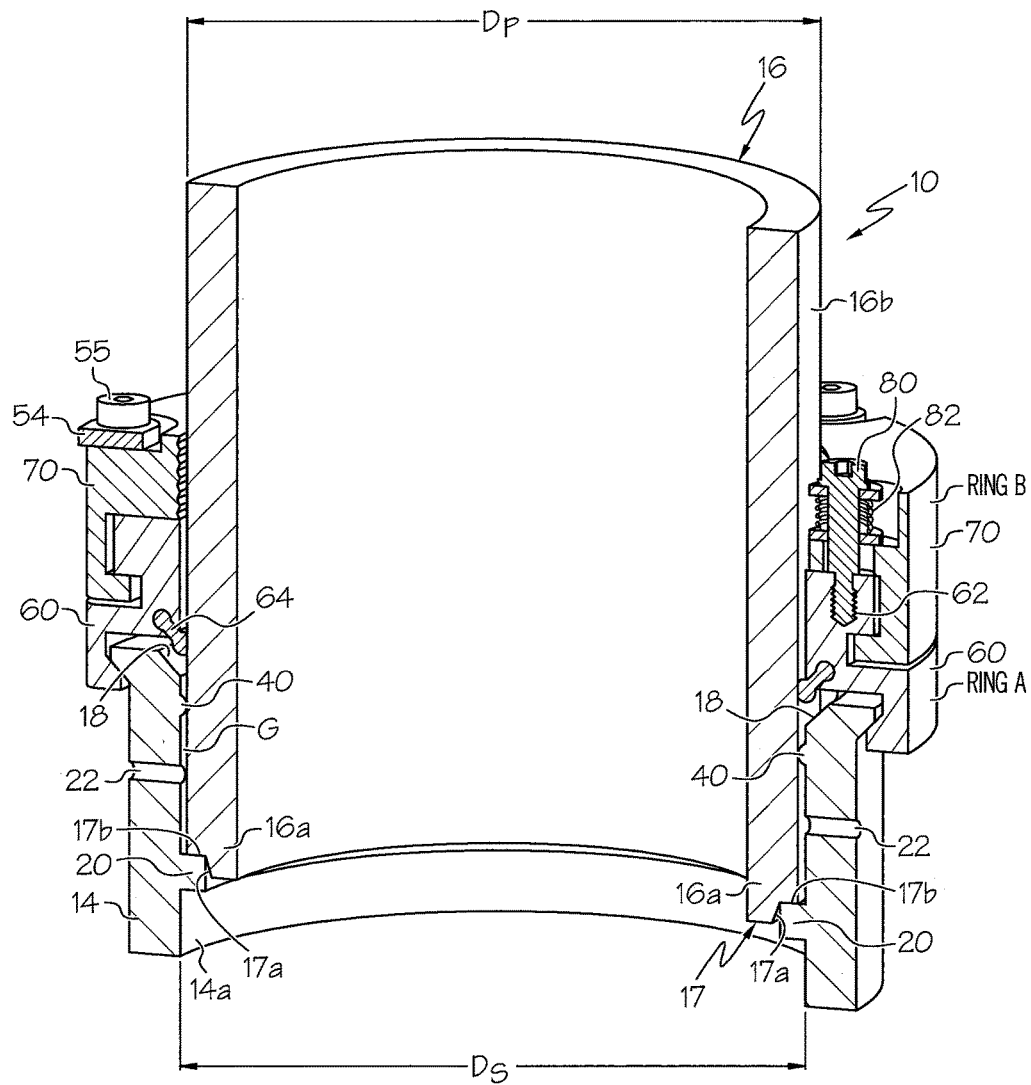
FIG. 3 is a cross-sectional view of the pipe fitting of FIG. 1 taken along lines 2-2 and illustrating circumferentially spaced-apart raised members extending outwardly from the inner surface of the socket which serve as the centering device, according to some embodiments of the present invention.

Referring now to FIGS. 1-3, a pipe fitting 10, according to some embodiments of the present invention, is illustrated. The pipe fitting 10 includes a tubular member 12 having a socket 14 configured to receive an end 16a of a pipe section 16 therein. The pipe fitting 10 can be shaped as a straight union, an elbow, a "T", a "Y", a cross or any other desired geometry. The socket 14 has an internal diameter Ds that is larger than the outer diameter Dp of the pipe section such that a gap G exists between an outer surface of the pipe section 16 and an inner surface 14a of the socket 14 when the pipe section 16 is centered within the socket 14. The socket 14 includes an open free end 18 through which the end 16a of the pipe section 16 is inserted and a pipe stop 20 that is configured to matingly engage with the end 16a of the pipe section. In the illustrated embodiment, the pipe stop 20 is an annular member that extends from the inner surface 14a of the socket 14.

In some embodiments of the present invention, prior to insertion within the socket, material is removed from the pipe end 16a (e.g., via a hand tool or lathe, etc.) to create a profiled end 17 that matingly engages with the pipe stop 20. As illustrated, the profiled end 17 includes a tapered portion 17a and an engagement portion 17b. The tapered portion 17a is inserted into the opening of the annular pipe stop 20 and the engagement portion 17b is configured to abut against the pipe stop 20 in face-to-face relationship. The profiled end 17 acts as a locating pin at the pipe stop 20 and facilitates insertion of the pipe end 16a fully within the socket 14. The tapered portion 17a of the pipe end 16a is angled such that when the pipe section 16 is fully bottomed against the pipe stop 20, the pipe section 16 cannot move side to side (radially) in any direction.

A pair of ports 22 extend through the tubular member 12 in circumferentially spaced-apart relationship and are in fluid communication with the gap G. In the illustrated embodiment, the ports 22 are diametrically opposed. A bonding agent is injected into the gap G via one of these ports 22, as will be described below.

The socket 14 also includes a centering device that is configured to maintain a coaxial relationship between the pipe section 16 and the socket 14 and such that the gap G is substantially circumferentially uniform. This allows a bonding agent (BA, FIGS. 11 and 13) injected into the gap G to have a substantially circumferentially uniform thickness, which results in a strong, uniform bond between the pipe section 16 and the fitting 12.

In the embodiment illustrated in FIG. 2, the centering device is a centering ring 30 that is positioned within the socket 14. In addition to further aligning the pipe section 16 in the socket 14, the centering ring 30 also prevents the pipe section from being pulled out of the socket 14. As will be described below, the centering ring 30 has teeth which become embedded into the inner surface 14a of the socket 14 and outer surface 16a of the pipe section 16 to prevent pipe pull-out once inserted into the socket 14. In addition to aligning the pipe section 16 in the center of the socket 14 and preventing pipe pull-out, the centering ring 30 also provides some resistance to pipe rotation within the socket 14.

In the embodiment illustrated in FIG. 3, the centering device comprises a plurality of raised members or bumps 40 extending outwardly from the inner surface 14a of the socket 14 in circumferentially spaced-apart relationship. For example, in some embodiments, the bumps 40 are substantially equidistantly spaced-apart. For example, in some embodiments, there are three bumps spaced-apart by 120°. The bumps 40 may be a molded feature of the socket 14. Although illustrated as bumps, the raised members 40 may have various shapes and configurations and there may be various numbers of raised members 40 (typically at least three).

Figure 4:
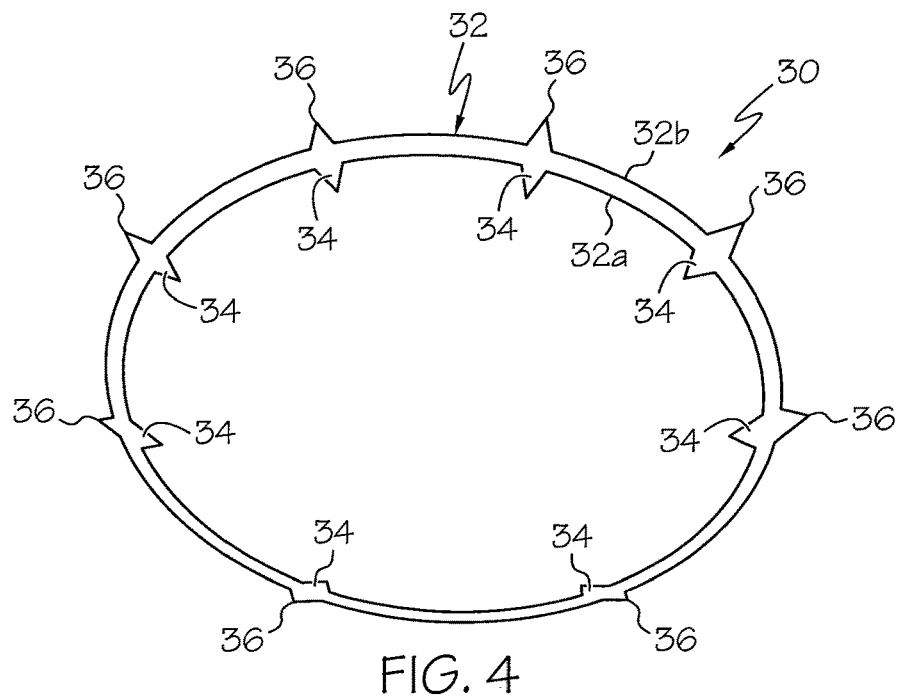
FIG. 4 is a perspective view of a pipe joint centering ring, according to some embodiments of the present invention.

Referring to FIG. 4, a centering ring 30, according to some embodiments of the present invention, is illustrated. The illustrated centering ring 30 includes an annular member 32 that has opposite inner and outer peripheral edges 32a, 32b. The illustrated centering ring 30 has a frusto-conical shape. The illustrated centering ring 30 is configured to be secured within the socket 14 of the tubular member 12 (FIG. 2) or the socket of other types of pipe fittings/connectors.

A first plurality of inwardly projecting gripping teeth 34 are on the inner peripheral edge 32a in circumferentially spaced-apart relationship. A second plurality of outwardly projecting gripping teeth 36 are on the outer peripheral edge 32b in circumferentially spaced-apart relationship. Typically, adjacent ones of the first plurality of gripping teeth 34 are spaced-apart between about one-quarter inch and about one inch (0.25"-1.0"). Similarly, adjacent ones of the second plurality of gripping teeth 36 typically are spaced-apart between about one-quarter inch and about one inch (0.25"-1.0"). However, the first plurality of gripping teeth 34 may be spaced apart by various other distances, and the second plurality of gripping teeth 36 may be spaced apart by various other distances.

In the illustrated embodiment of FIG. 4, the first and second plurality of teeth 34, 36 have a triangular shape and are substantially the same size. However, the first and/or second plurality of teeth 34, 36 may have various other shapes. In addition, each one of the first plurality of gripping teeth 34 are substantially adjacent to a respective one of the second plurality of gripping teeth 36. However, in other embodiments, the first and second plurality of gripping teeth 34, 36 may be staggered relative to each other.

Figure 6:
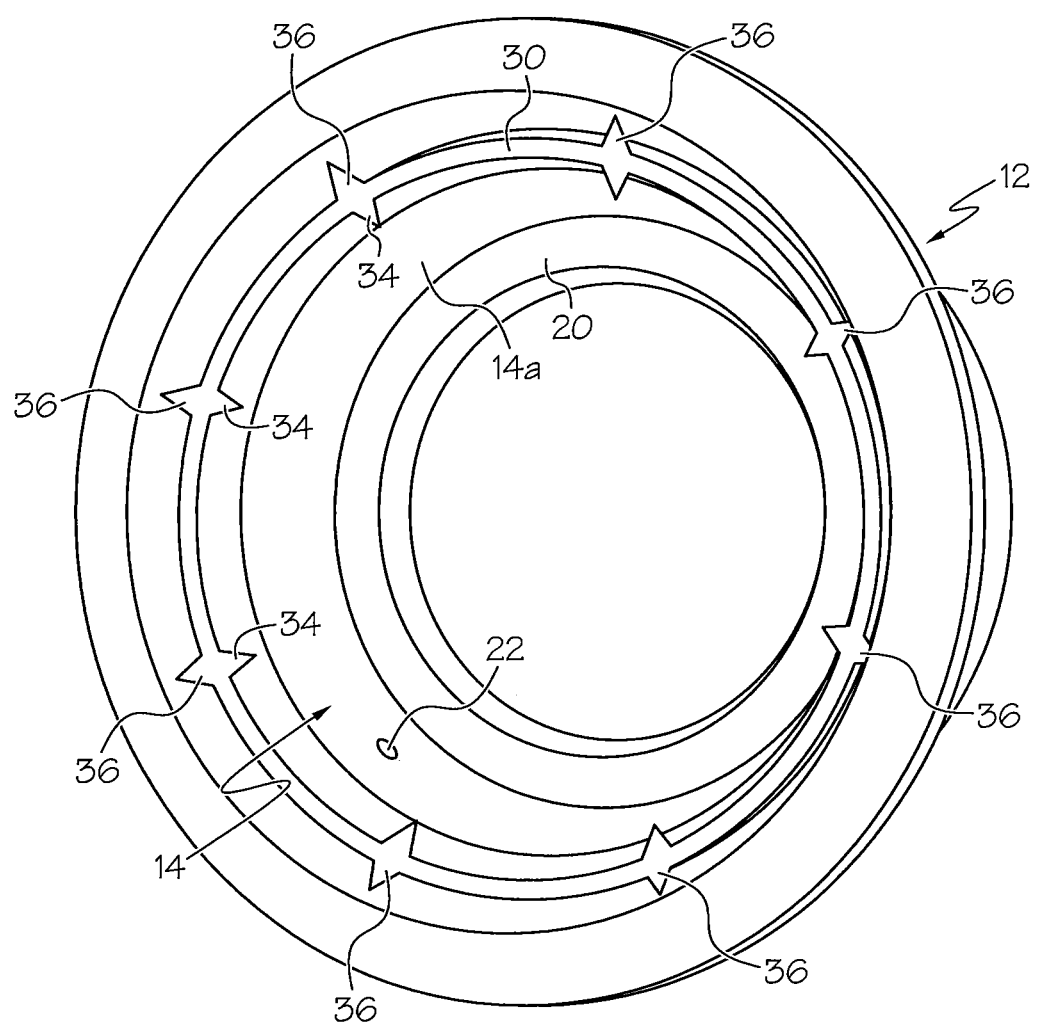
FIG. 6 illustrates the centering ring of FIG. 4 secured within a socket of a pipe fitting, according to some embodiments of the present invention.

The first plurality of gripping teeth 34 are configured to grip the outer surface 16a of a pipe section 16 inserted within the socket 14 of the pipe fitting 10. In addition, the second plurality of gripping teeth 36 are configured to grip a portion of the inner surface 14a of the socket 14, as illustrated in FIG. 6.

Figure 5:
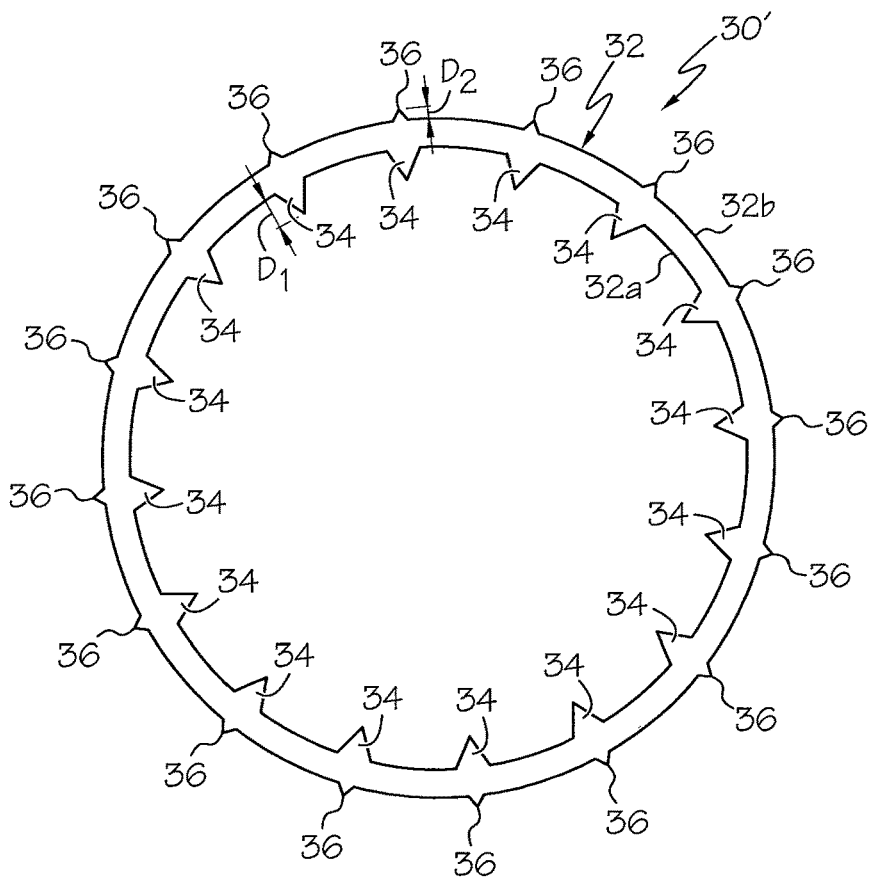
FIG. 5 is a plan view of a pipe joint centering ring, according to some embodiments of the present invention.

Referring to FIG. 5, a pipe joint centering ring 30', according to other embodiments of the present invention, is illustrated. The illustrated centering ring 30' includes an annular member 32 that has opposite inner and outer peripheral edges 32a, 32b. The illustrated centering ring 30' has a generally planar configuration and is configured to be secured within the socket 14 the tubular member 12 (FIG. 2) or the socket of other types of pipe fittings/connectors.

A first plurality of inwardly projecting gripping teeth 34 are on the inner peripheral edge 32a in circumferentially spaced-apart relationship. A second plurality of outwardly projecting gripping teeth 36 are on the outer peripheral edge 32b in circumferentially spaced-apart relationship. As with the centering ring embodiment illustrated in FIG. 4, typically, adjacent ones of the first plurality of gripping teeth 34 are spaced-apart between about one-quarter inch and about one inch (0.25"-1.0"). Similarly, adjacent ones of the second plurality of gripping teeth 36 typically are spaced-apart between about one-quarter inch and about one inch (0.25"-1.0"). However, the first plurality of gripping teeth 34 may be spaced apart by various other distances, and the second plurality of gripping teeth 36 may be spaced apart by various other distances.

In the illustrated embodiment of FIG. 5, the first and second plurality of teeth 34, 36 have a triangular shape and each one of the first plurality of gripping teeth 34 are substantially adjacent to a respective one of the second plurality of gripping teeth 36. However, in other embodiments, the first and second plurality of gripping teeth 34, 36 may have other shapes and may be staggered relative to each other.

In the illustrated embodiment of FIG. 5, the first plurality of gripping teeth 34 are larger than the second plurality of gripping teeth 36. Moreover, a distance $D_1$ that each of the first plurality of gripping teeth 34 project inwardly from the inner peripheral edge 32a is greater than a distance $D_2$ that each of the second plurality of gripping teeth 36 project outwardly from the outer peripheral edge 32b.

The pipe joint centering rings 30, 30' of FIGS. 4 and 5 may be formed of various materials without limitation. Exemplary materials include, but are not limited to aluminum and stainless steel (e.g., SS 304, etc.).

Figure 7:
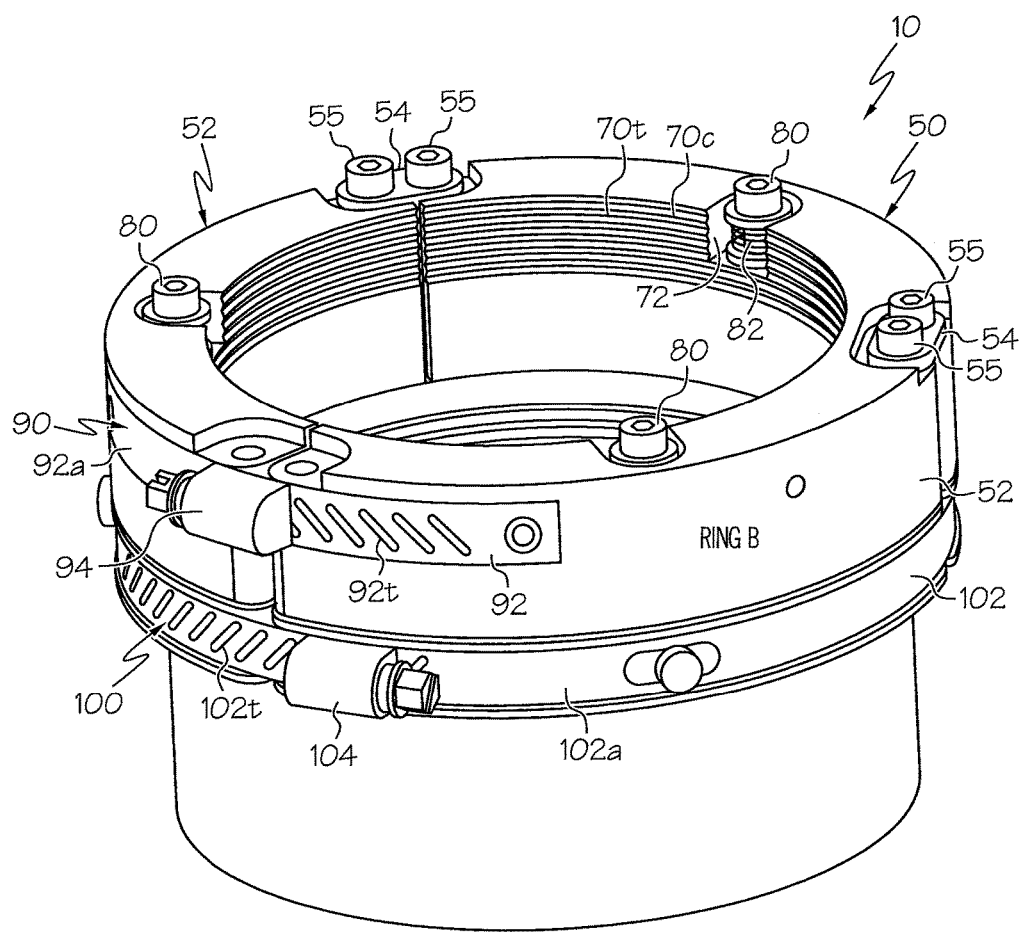
FIG. 7 is a perspective view of a removable clamp that can be utilized with the pipe fittings of FIGS. 1 and 2, according to some embodiments of the present invention.
Figure 8:
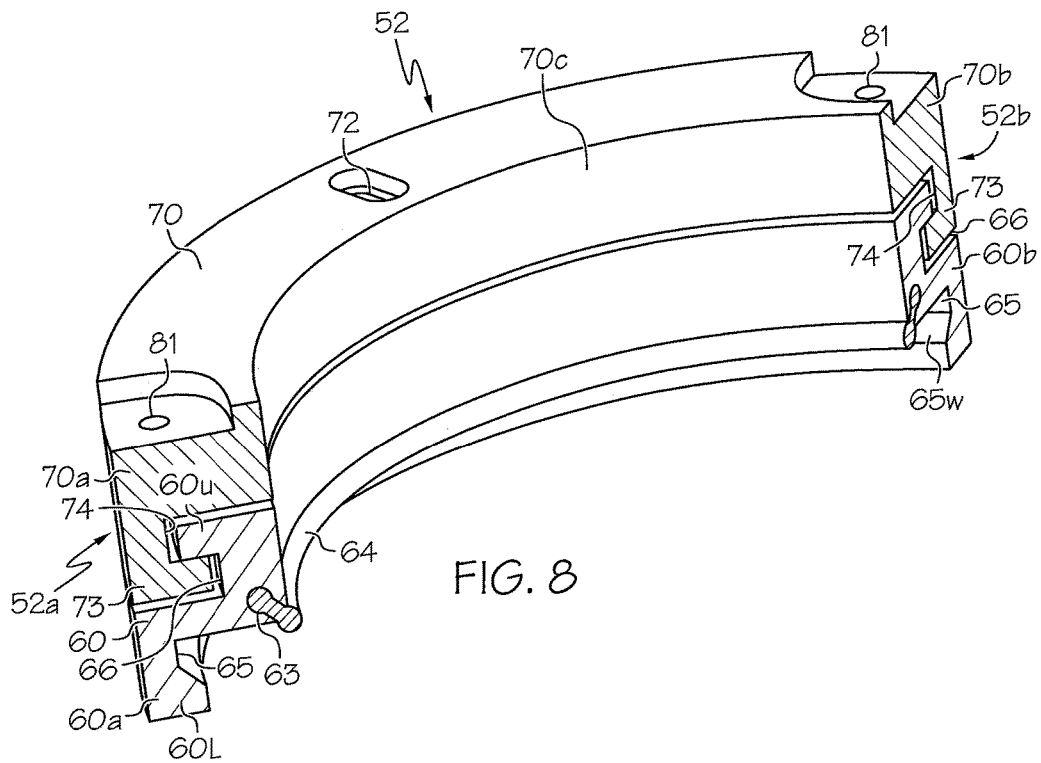
FIG. 8 is a perspective view of one of the arcuate segments of the removable clamp of FIG. 7.

Referring to FIGS. 1-3 and 7, the illustrated pipe fitting 10 also includes a removable and reusable clamp 50 that secures the pipe section 16 (FIGS. 1-3) within the socket 14 as a bonding agent is injected into the gap G via one of the ports 22. The illustrated clamp 50 includes a plurality of arcuate segments 52. In the illustrated embodiment, the clamp includes three arcuate segments 52, each defining an arc of about 120°. However, embodiments of the present invention are not limited to three arcuate segments. Various numbers of arcuate segments 52 may be utilized. As illustrated in FIG. 8, each arcuate segment 52 includes first and second members 60, 70 that are matingly engaged and are secured together via a fastener. As such, the plurality of first and second members when joined together as described below form two rings (Ring A and Ring B) that are movably secured to each other and that work in concert with each other. Operation of the "A" and "B" rings are identified in cross-sectional view in FIGS. 10-13.

The first and second members 60, 70 of each arcuate segment 52 are secured together via a threaded fastener 80. As illustrated, the threaded fastener 80 extends through an aperture 72 in the second member 70 and threadingly engages threads 62 formed in the first member 60. A biasing member or spring 82 is associated with the fastener 80 and allows the first and second members 60, 70 (and, thereby, Ring A and Ring B) to axially separate as Ring A is radially compressed, as will be described below.

In the illustrated embodiment there are three arcuate segments 52, each having opposite end portions 52a, 52b. Accordingly, there are three locations where end portion 52a of one arcuate segment 52 is adjacent end portion 52b of an adjacent arcuate segment. The three arcuate segments 52 are joined together at two of these locations via hinges 54 (FIG. 7). The hinges facilitate movement of the arcuate segments 52 relative to each other to facilitate installation of the clamp 50 around a pipe fitting 12 and pipe section 16. In the illustrated embodiment, the hinges 54 are secured to adjacent end portions 70a, 70b of the second members 70 via threaded fasteners 55 which are threadingly secured to the second members 70 via threaded openings 81. However, there are various ways of connecting adjacent end portions 70a, 70b of the second members 70 and embodiments of the present invention are not limited to the illustrated configuration.

At the third location where end portion 52a of one arcuate segment 52 is adjacent end portion 52b of an adjacent arcuate segment, a tightening member 90 (FIG. 7) is provided. When the clamp 50 is installed on the pipe section 16 and pipe fitting 12, the tightening member 90 is used to radially compress the second members 70 into contact with the outer surface 16a of the pipe section 16. The illustrated tightening member 90 includes an elongated band 92 secured to one of the second members 70 and a rotatable member 94 secured to the adjacent second member 70. The band 92 includes a thread pattern 92t (e.g., similar to a hose clamp, etc.) formed in a surface 92a thereof. The rotatable member 94 includes a rotatable worm with teeth (not shown) that are configured to engage the thread pattern 92t. Rotation of the worm in one direction causes the tightening member 90 to radially compress the second members 70 into contact with the outer surface 16a of the pipe section 16 such that the clamp 50 is secured to the pipe section 16. In the illustrated embodiment, each second member 70 includes a contact surface 70c that includes teeth 70t for gripping the outer surface 16a of the pipe section 16.

Each arcuate segment 52 also includes a sealing member 64 (FIG. 8) attached to the first member 60, thereof. In the illustrated embodiment, each arcuate segment first member 60 includes a slot 63 formed therein. The sealing member 64 is an elastomeric material, such as rubber, and has a bar-bell or dog-bone shaped cross-sectional configuration and is configured to slide into the slot 63. This allows the sealing member 64 to be replaced if damaged and for cleaning purposes.

Figure 9:
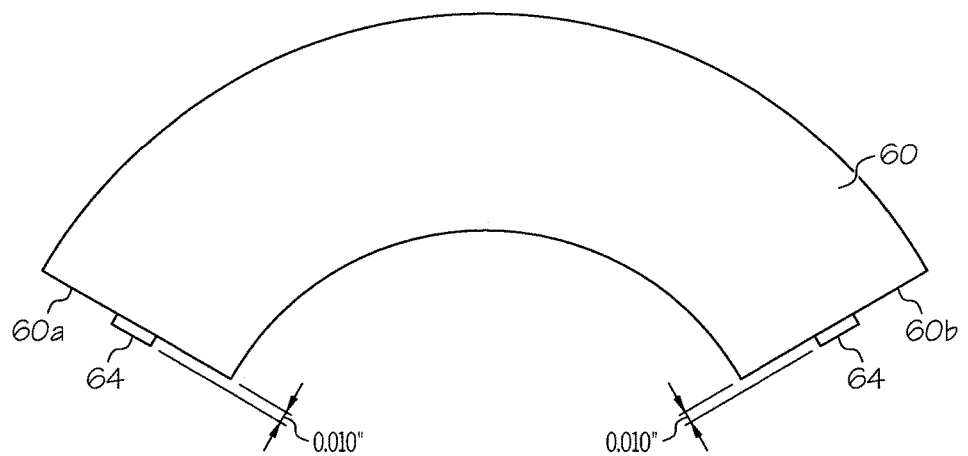
FIG. 9 is a plan view of one of the arcuate segments of the removable clamp of FIG. 7 and illustrating the length of a sealing member relative to a length of the arcuate segment.

As illustrated in FIG. 9, each sealing member 64 has a length that is greater than a length of the respective arcuate segment first member 60 to which the sealing member 64 is attached. For example, in some embodiments, the length of each sealing member may be at least about 0.010 inch longer than the length of the arcuate segment first member 60. This extra length ensures that the ends of each sealing member 64 touch the ends of adjacent sealing members 64, thereby forming an annular seal that surrounds the pipe section 16. This annular seal prevents leakage of the bonding agent during the injection process.

As illustrated in FIGS. 2, 3, 8 and 10-13, the first and second members 60, 70 of each arcuate segment 52 are matingly engaged with each other. Each first member 60 has a serpentine or "S-shaped" cross-sectional configuration with an upper portion 60u and a lower portion 60L and that includes opposing arcuate grooves or channels 65, 66, as illustrated. Each second member 70 has a lower end portion 73 that has a generally "L-shaped" configuration that includes an arcuate groove or channel 74. An upper portion 60u of the first member is located within the channel 74 of the second member 70. The channel 74 has a height H1 that that is greater than a height H2 of the first member upper portion 60u. This allows the first members 60 of the arcuate segments 52 to move axially relative to the second members 70 during tightening of the clamp 50, as will described below.

The arcuate channel 65 in each of the first members 60 includes a sloped inner wall 65w, as illustrated. The tubular member 12 includes an annular flange 12f having a sloped outer wall 12w. When the clamp 50 is installed around a pipe section 16 and fitting 14, the arcuate groove 65 of each of the first members 60 receives the tubular member annular flange 12f therein. The sloped inner wall 65w of the groove 65 engages the annular flange sloped outer wall 12w. This configuration allows the first members 60 of each arcuate segment 52 to move axially away from the second members 70 as the first members 60 are moved radially inwardly via a tightening mechanism 100.

The illustrated tightening member 100 is configured to radially compress the first members 60 of each arcuate segment 52 such that the first members move radially and compress the respective sealing members 64 into sealing engagement with the tubular member 12 and pipe section 16 to seal an open end of the gap G. When a bonding agent is injected into the gap via a port, the sealing members prevent the bonding agent from leaking out of the open end of the socket. Once the bonding agent is injected, the clamp 50 is removed and can be reused. The clamp 50 may be removed before or after the bonding agent cures.

The illustrated tightening member 100 includes an elongated band 102 (FIG. 7) that extends around the first members 60 and includes a rotatable member 104. The band 102 includes a thread pattern 102t (e.g., similar to a hose clamp, etc.) formed in a surface 102a thereof. The rotatable member 104 includes a rotatable worm with teeth (not shown) that are configured to engage the thread pattern 102t. Rotation of the worm in one direction causes the tightening member 100 to radially compress the first members 60 (i.e., Ring A) such that the first members 60 move radially and compress the respective sealing members 64 into sealing engagement with the tubular member 12 and pipe section 16 to seal an open end of the gap G.

Figure 10:
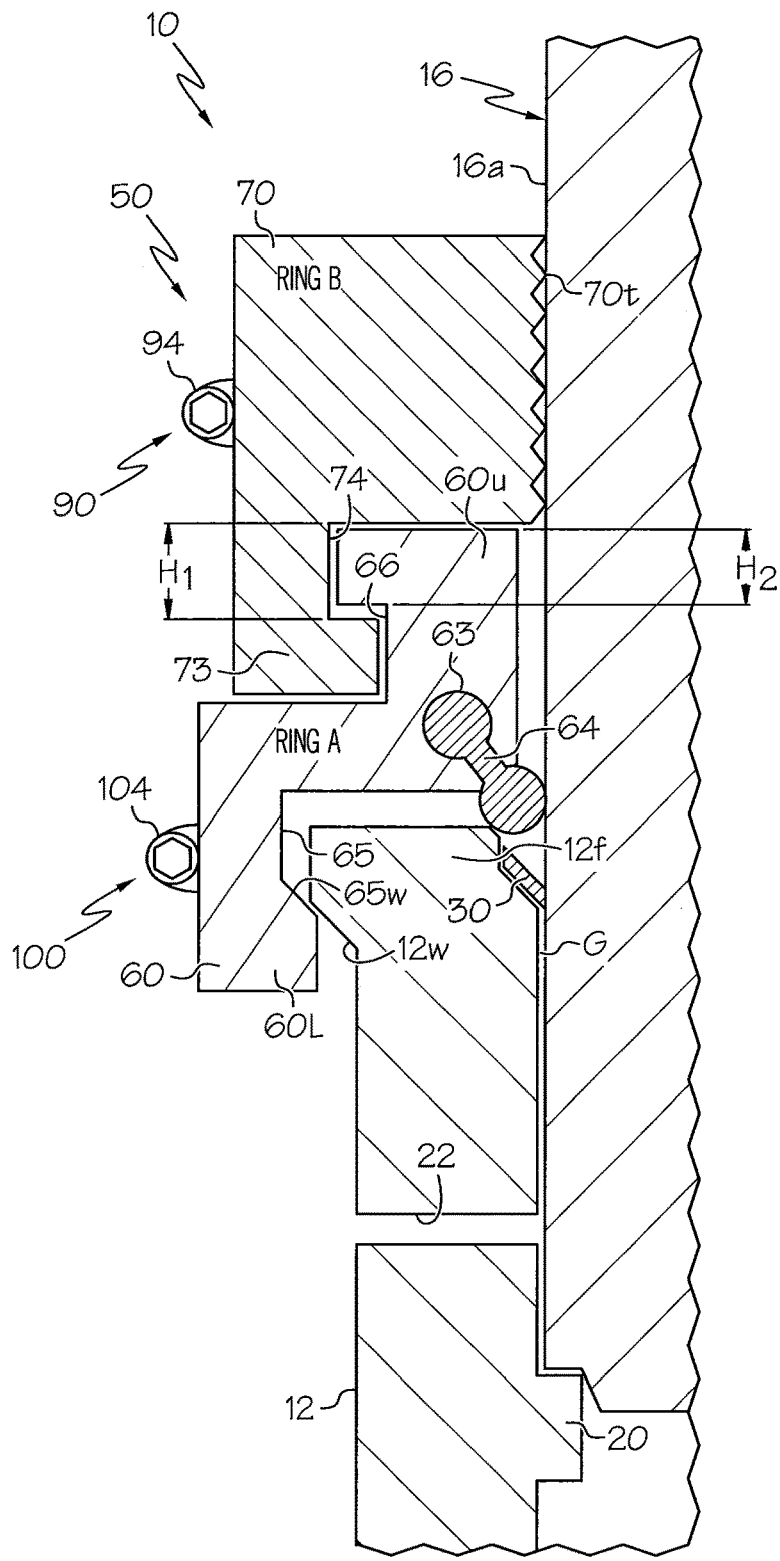
FIGS. 10 and 11 are partial views of the pipe fitting of FIG. 2 and illustrate relative movement between the first and second members of an arcuate segment of the removable clamp as the clamp is tightened.
Figure 11:
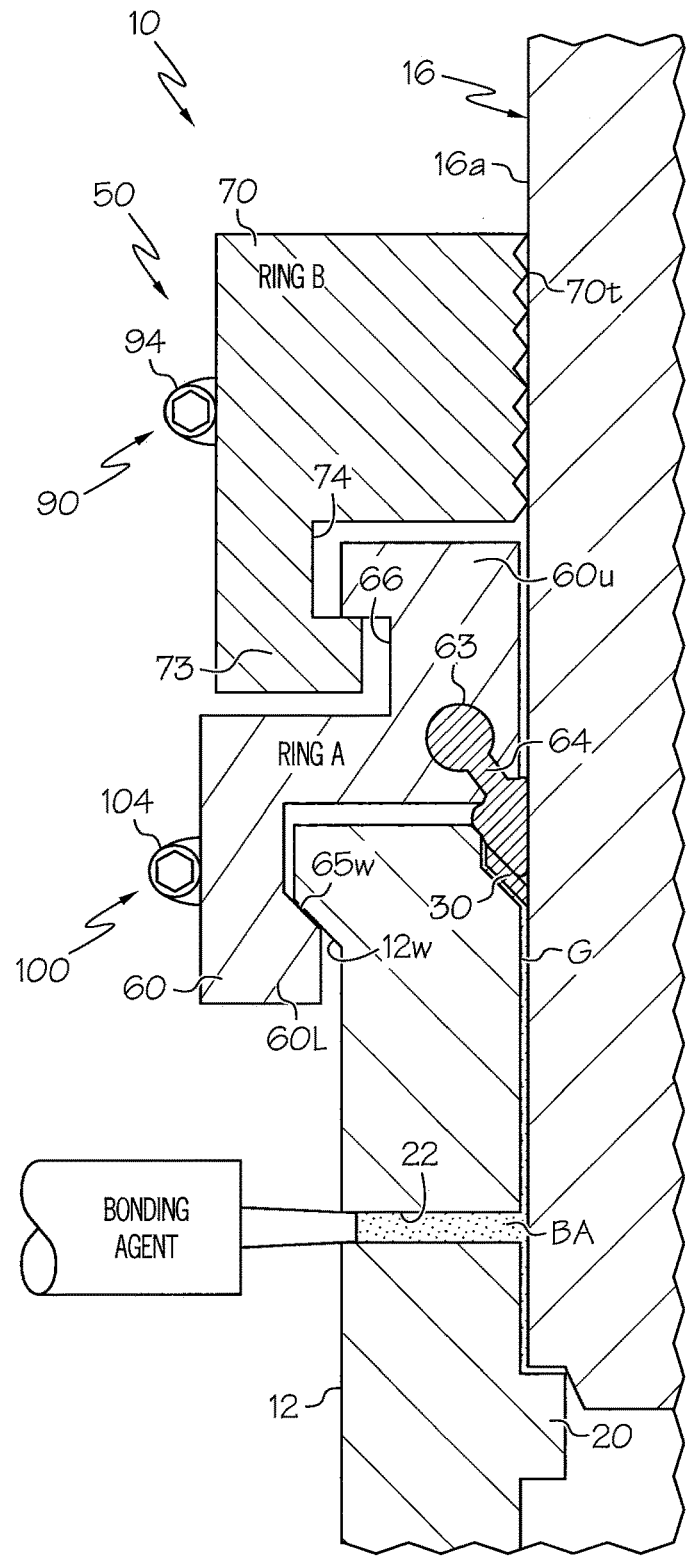
Figure 12:
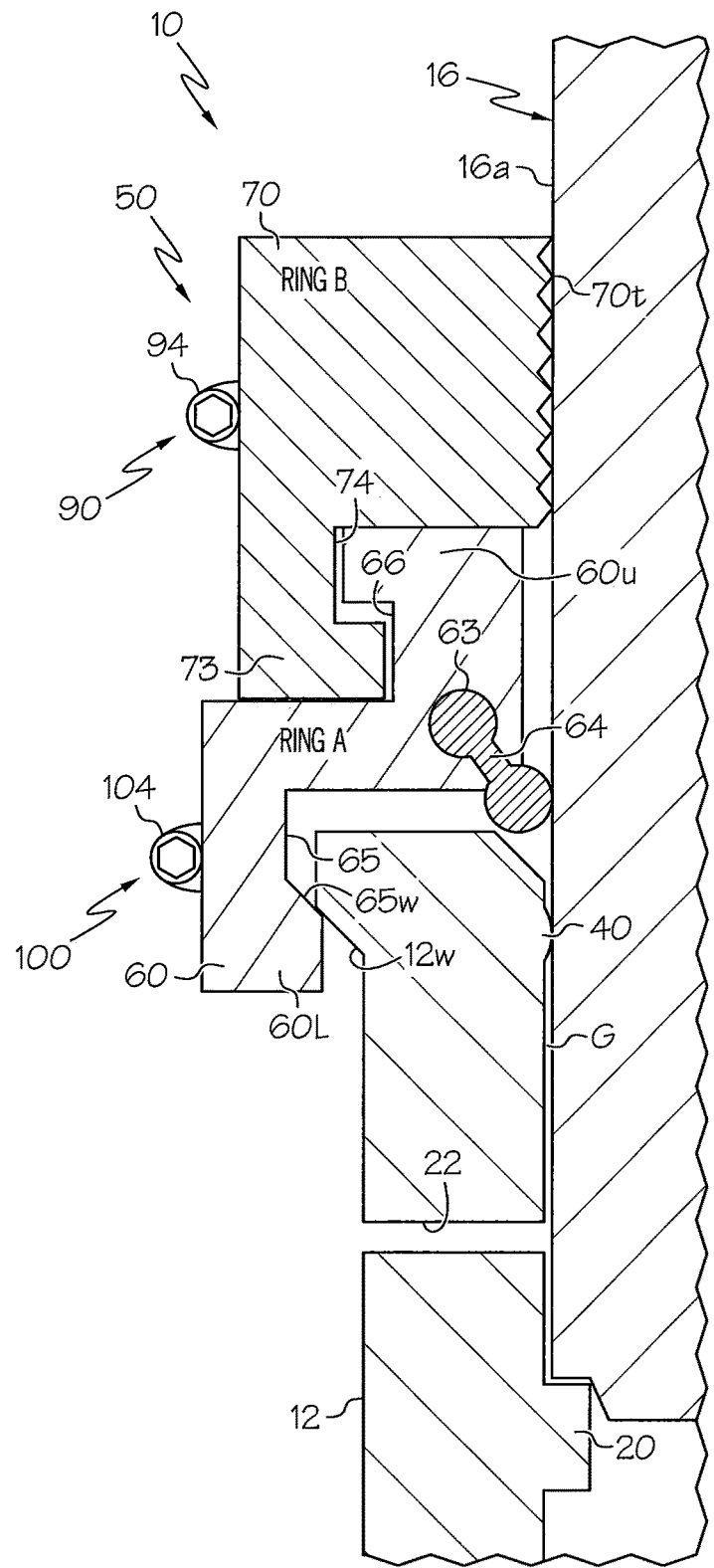
FIGS. 12 and 13 are partial views of the pipe fitting of FIG. 3 and illustrate relative movement between the first and second members of an arcuate segment of the removable clamp as the clamp is tightened.
Figure 13:
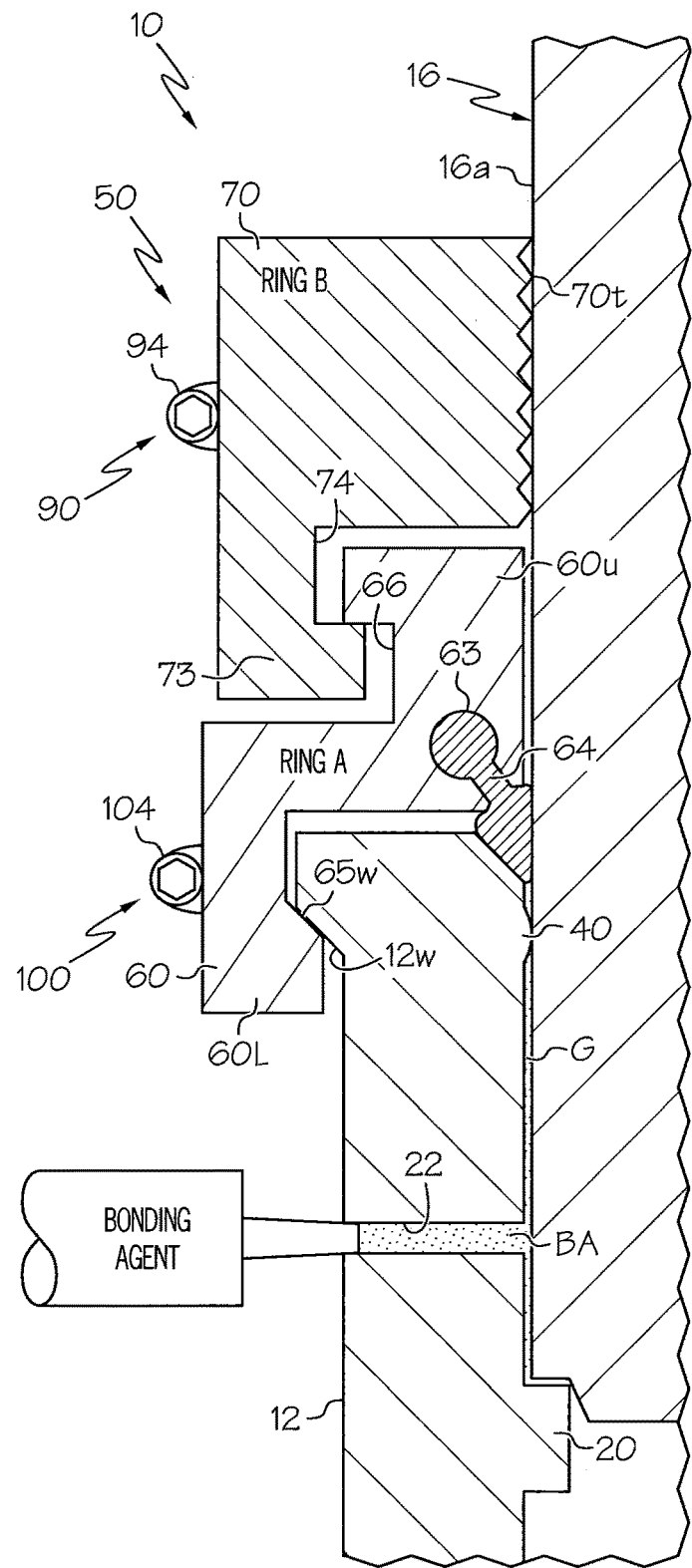

Radial compression of the first members 60 also causes the first members 60 to move axially away from the second members as the sloped inner walls 65w of the grooves 65 of the first members 60 engage the annular flange sloped outer wall 12w. This is illustrated in FIGS. 10-13. FIGS. 10 and 11 illustrate the embodiment of FIG. 2 wherein the centering device is a centering ring 30 and FIGS. 12 and 13 illustrate the embodiment of FIG. 3 wherein the centering device is a plurality of circumferentially spaced-apart raised members or bumps 40.

In FIGS. 10 and 12, the clamp 50 is installed on the pipe section 16 and fitting 12. The upper tightening member 90 has been tightened such that the second members 70 are radially compressed into contact with the outer surface 16a of the pipe section. The lower tightening member 100 is loose in FIGS. 10 and 12. Referring now to FIGS. 11 and 13, the lower tightening member 100 has been tightened such that the first members 60 are compressed radially inwardly. The radial compression causes the first members 60 to move axially away from the second members 70 (downwardly in FIGS. 11 and 13) as the sloped inner wall 65w of each groove 65 slides along the annular flange sloped outer wall 12w. As such, the sealing members 64 are compressed into sealing engagement with the tubular member 12 and pipe section 16 to seal an open end of the gap G, as illustrated in FIGS. 11 and 13.

The pipe fitting is ready to receive a bonding agent BA in the gap G, as illustrated in FIGS. 11 and 13. Typically, only one of the ports 22 is used for injecting the bonding agent into the gap G that is formed between the outer surface 16a of the pipe section 16 and the inner surface 14a of the socket 14, and the other port 22 is used as a vent to allow air to escape as it is pushed out by the bonding agent, and to identify when the gap is full of bonding agent. Exemplary bonding agents that may be used to join the pipe section 50 and the connector 30 are described in, for example, U.S. Pat. Nos. 4,052,244, 5,656,345, 6,949,602, U.S. Patent Application Publication No. 2013/0267670, and U.S. Patent Application Publication No. 2013/0261247, all of which are incorporated herein by reference in their entireties. Once the bonding agent BA is injected into the gap G, the clamp 50 is removed. The clamp 50 may be removed before or after the bonding agent BA cures.

Referring now to FIG. 14 the pipe fitting 10 of FIGS. 1-3 is illustrated with a reinforcement band 104 positioned therearound. As described above, the pipe fitting has a tubular member 12 with a socket 14 configured to receive an end of a pipe section therein. A pair of ports 22 extend through the tubular member 12 that facilitate the injection of adhesive into the socket, as described above. The illustrated reinforcement band 104 includes openings 106 formed therein to provide access to the ports 22. The reinforcement band 104 can have various shapes, sizes and configurations. Embodiments of the present invention are not limited to the illustrated configuration of the reinforcement band 104.

The reinforcement band 104 may be secured (e.g., adhesively secured, etc.) to the outer surface of the tubular member 12 or may be positioned onto the tubular member 12 and held in place via friction. Other methods of securing the reinforcement band 104 around the tubular member 12 are possible including, but not limited to, crimping, clamping (e.g., via a clamp, such as a pipe or hose clamp), etc. In some embodiments, the reinforcement band 104 may be positioned and/or secured onto the tubular member 12 during manufacturing of the tubular member 12.

The reinforcement band 104 may be formed from various materials, but is typically a metal reinforcement band, such as, but not limited to, steel, stainless steel, aluminum, brass, etc. The reinforcement band 104 is typically used in high pressure and/or temperature piping environments. The reinforcement band can reduce stress in the wall of the pipe fitting 10 in the hoop direction and can provide dimensional stability.

Referring now to FIGS. 15 and 16, a pipe fitting 200 comprising a socket 202 that is configured to receive an end of a pipe section therein is illustrated. The illustrated pipe fitting 200 is referred to as a "brush on" pipe fitting in that adhesive is applied to the outer surface of the end of a pipe section, for example via an applicator such as a brush, prior to insertion into the pipe fitting socket 202. The pipe fitting 200 includes a reinforcement band 204 positioned around an outer surface of the pipe fitting 200, as illustrated. The reinforcement band 204 may be secured (e.g., adhesively secured, etc.) to the outer surface of the pipe fitting 200 or may be positioned onto the pipe fitting 200 and held in place via friction.

As described above with respect to FIG. 14, the reinforcement band 204 may be formed from various materials, but is typically a metal reinforcement band, such as, but not limited to, steel, stainless steel, aluminum, brass, etc. The reinforcement band 204 is typically used in high pressure and/or temperature piping environments. The reinforcement band can reduce stress in the wall of the pipe fitting 200 in the hoop direction and can provide dimensional stability. The reinforcement band 204 can have various shapes and configurations. Embodiments of the present invention are not limited to the illustrated configuration of the reinforcement band 204.

According to other embodiments of the present invention, a pipe fitting (e.g., pipe fitting 10 of FIGS. 1-3, pipe fitting 200 of FIGS. 15-16) may be formed with glass fiber reinforcement (GFR) material therein to improve hoop strength of the pipe fitting. The term "glass fiber", as used herein, is intended to include various types of reinforcing fibers including, but not limited to, glass, carbon, aramid, basalt, and the like.

A pipe fitting with GFR material therein is typically used in high pressure and/or temperature piping environments. The GFR material can reduce stress in the wall of the pipe fitting in the hoop direction and can provide dimensional stability.

Figure 17:
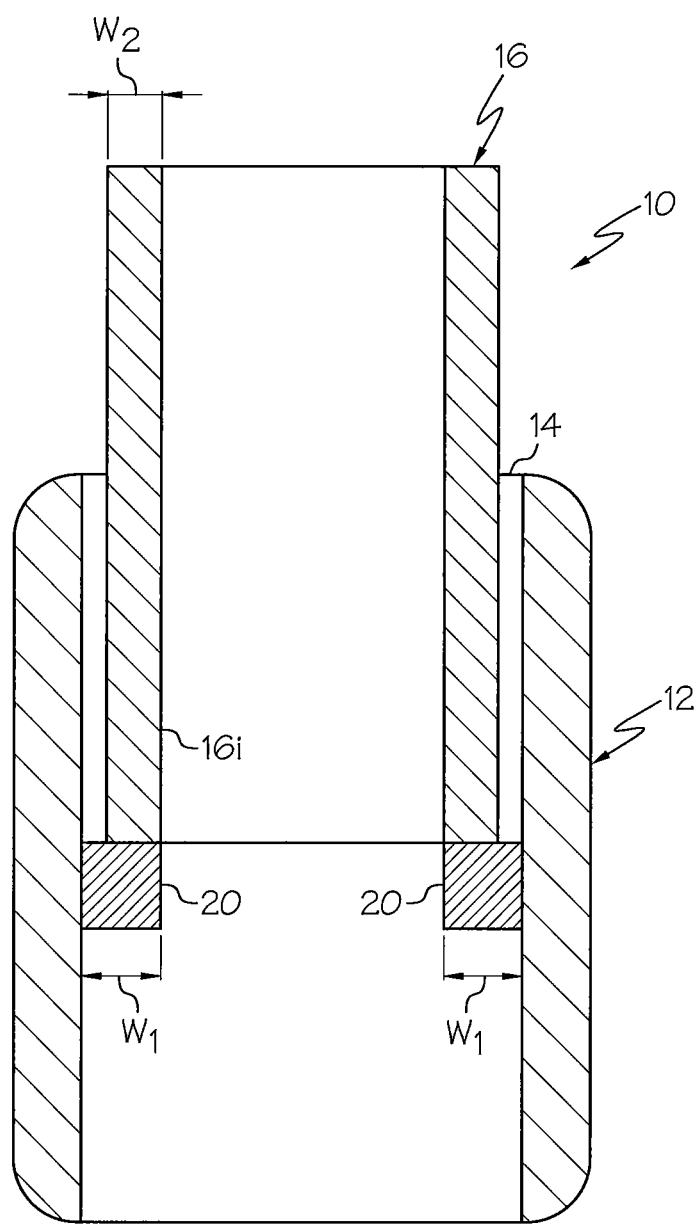
FIG. 17 is a side cut-away view of a pipe fitting with a pipe stop having an increased radial length, according to some embodiments of the present invention.

Referring now to FIG. 17, the pipe fitting 10 of FIGS. 1-3 is illustrated with a pipe stop 20 having an increased radial length $W_1$ as compared with the embodiment of FIGS. 1-3. In the illustrated embodiment of FIG. 17, the radial length $W_1$ of the pipe stop 20 is greater than the thickness $W_2$ of the wall of the pipe 16 inserted within the socket 14. In the illustrated embodiment, the radial length $W_1$ of the pipe stop causes the radial inner edge 20a of the pipe stop to align with the inner surface 16i of the pipe 16 inserted within the socket 14. The pipe stop 20 having the increased radial length, as illustrated in FIG. 17, increases the hoop strength of the socket and is typically used in high pressure and/or temperature piping environments. In other embodiments, the radial length $W_1$ of the pipe stop may be substantially the same as the thickness $W_2$ of the wall of the pipe 16.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. A pipe fitting, comprising:
   a tubular member comprising a socket configured to receive an end of a pipe section therein such that a gap exists between an outer surface of the pipe section and an inner surface of the socket, wherein a pair of ports extend through the tubular member in circumferentially spaced-apart relationship and are in fluid communication with the gap;
   a centering device within the socket that is configured to maintain a coaxial relationship between the pipe section and the socket and such that the gap is substantially circumferentially uniform; and a clamp that secures the pipe section within the socket as a bonding agent is extruded into the gap via one of the ports, wherein the clamp comprises a plurality of arcuate segments, each arcuate segment comprising first and second members and a sealing member, wherein the clamp comprises a tightening mechanism that is configured to radially compress the clamp such that the sealing members are compressed into sealing engagement with the tubular member and pipe section to seal an open end of the gap, wherein the first and second members of each clamp segment are matingly engaged with each other and are secured together via at least one fastener, and wherein the second member of each clamp segment comprises teeth configured to engage the pipe section.

2. The pipe fitting of claim 1, wherein the centering device is a centering ring, comprising:
an annular member comprising opposite inner and outer peripheral edges;
a first plurality of inwardly projecting gripping teeth on the inner peripheral edge in circumferentially spaced-apart relationship; and
a second plurality of outwardly projecting gripping teeth on the outer peripheral edge in circumferentially spaced-apart relationship.

3. The pipe fitting of claim 2, wherein a distance that each of the first plurality of gripping teeth project inwardly from the inner peripheral edge is greater than a distance that each of the second plurality of gripping teeth project outwardly from the outer peripheral edge.

4. The pipe fitting of claim 2, wherein the first plurality of gripping teeth are larger than the second plurality of gripping teeth.

5. The pipe fitting of claim 2, wherein the first plurality of gripping teeth are staggered relative to the second plurality of gripping teeth.

6. The pipe fitting of claim 1, wherein the centering device comprises a plurality of raised members extending outwardly from the inner surface of the socket in circumferentially spaced-apart relationship.

7. The pipe fitting of claim 1, wherein the tubular member comprises an annular flange having a sloped outer wall, wherein each first member comprises an arcuate groove configured to receive a portion of the tubular member annular flange, wherein the arcuate groove in each first member comprises a sloped inner wall that engages the annular flange sloped outer wall, wherein the sloped inner walls of the segments and the annular flange sloped outer wall move relative to each other as the first members of the arcuate segments are moved radially inwardly via the tightening mechanism.

8. The pipe fitting of claim 1, wherein the arcuate segments of the clamp are hingedly secured together.

9. The pipe fitting of claim 1, wherein a length of the sealing member of each arcuate segment is greater than a length of the respective arcuate segment, and wherein the sealing member of each arcuate segment is removably secured to the arcuate segment first member.

10. The pipe fitting of claim 1, wherein the tubular member comprises an annular pipe stop extending from the inner surface of the socket that is configured to matingly engage with the end of the pipe section.

11. The pipe fitting of claim 10, wherein the annular pipe stop has a radial length that is equal to or greater than a wall thickness of the pipe section.

12. The pipe fitting of claim 1, further comprising a reinforcement band positioned around the tubular member.

13. The pipe fitting of claim 12, wherein the reinforcement band comprises a pair of openings formed therein, each opening associated with a respective one of the pair of ports.

14. The pipe fitting of claim 1, wherein the tubular member comprises glass fiber reinforcement (GFR) material.

15. A pipe connector kit, comprising:
a tubular member comprising a socket configured to receive an end of a pipe section therein such that a gap exists between an outer surface of the pipe section and an inner surface of the socket, wherein a pair of ports extend through the tubular member in circumferentially spaced-apart relationship and are in fluid communication with the gap;
a centering device within the socket that is configured to maintain a coaxial relationship between the pipe section and the socket and such that the gap is circumferentially uniform; and
a clamp that secures the pipe section within the socket as a bonding agent is extruded into the gap via one of the ports, wherein the clamp comprises a plurality of arcuate segments, each arcuate segment comprising first and second members secured together and a sealing member, and wherein the clamp comprises a tightening mechanism that is configured to radially compress the clamp such that the sealing members are compressed into sealing engagement with the tubular member and pipe section to seal an open end of the gap;
wherein the tubular member comprises an annular flange having a sloped outer wall, wherein each first member comprises an arcuate groove configured to receive a portion of the tubular member annular flange, wherein the arcuate groove in each first member comprises a sloped inner wall that engages the annular flange sloped outer wall, wherein the sloped inner walls of the first members and the annular flange sloped outer wall move relative to each other as the first members of the arcuate segments are moved radially inwardly via the tightening mechanism.

16. The pipe connector kit of claim 15, further comprising a container of bonding agent, wherein the container is configured to inject the bonding agent into the gap via one of the ports.

17. The pipe connector kit of claim 15, wherein the centering device is a centering ring, comprising:
an annular member comprising opposite inner and outer peripheral edges;
a first plurality of inwardly projecting gripping teeth on the inner peripheral edge in circumferentially spaced-apart relationship; and
a second plurality of outwardly projecting gripping teeth on the outer peripheral edge in circumferentially spaced-apart relationship.

18. The pipe connector kit of claim 15, wherein the centering device comprises a plurality of raised members extending outwardly from the inner surface of the socket in circumferentially spaced-apart relationship.

19. The pipe connector kit of claim 15, wherein the first and second members of each clamp segment are matingly engaged with each other and are secured together via at least one fastener, and wherein the second portion of each clamp segment comprises teeth configured to engage the pipe section.

20. The pipe connector kit of claim 15, wherein the arcuate segments of the clamp are hingedly secured together.

21. The pipe connector kit of claim 15, wherein a length of the sealing member of each arcuate segment is greater than a length of the respective arcuate segment, and wherein the sealing member of each arcuate segment is removably secured to the arcuate segment first member.

22. The pipe connector kit of claim 15, wherein the tubular member comprises an annular pipe stop extending from the inner surface of the socket that is configured to receive the distal end of the pipe.

23. The pipe connector kit of claim 22, wherein the annular pipe stop has a radial length that is equal to or greater than a wall thickness of the pipe section.

24. The pipe connector kit of claim 15, further comprising a reinforcement band positioned around the tubular member.

25. The pipe connector kit of claim 15, wherein the tubular member comprises glass fiber reinforcement (GFR) material.

* * * * *

UNITED STATES PATENT AND TRADEMARK OFFICE
CERTIFICATE OF CORRECTION

| | | |
|---|---|---|
| PATENT NO. | : 10,487,969 B2 | Page 1 of 1 |
| APPLICATION NO. | : 14/858394 | |
| DATED | : November 26, 2019 | |
| INVENTOR(S) | : Roach et al. | |

It is certified that error appears in the above-identified patent and that said Letters Patent is hereby corrected as shown below:

In the Claims

Column 14, Lines 66-67, Claim 1:
Please correct "is substantially circumferentially" to read -- is circumferentially --

Signed and Sealed this
Twelfth Day of May, 2020

Andrei Iancu
*Director of the United States Patent and Trademark Office*